United States Patent Office 2,803,944
Patented Aug. 27, 1957

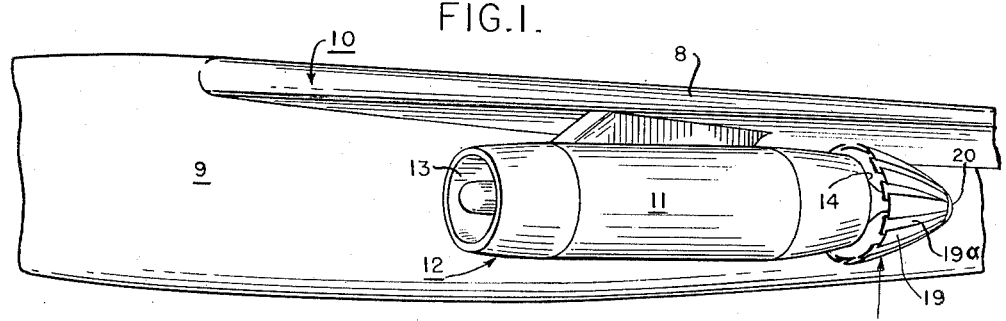
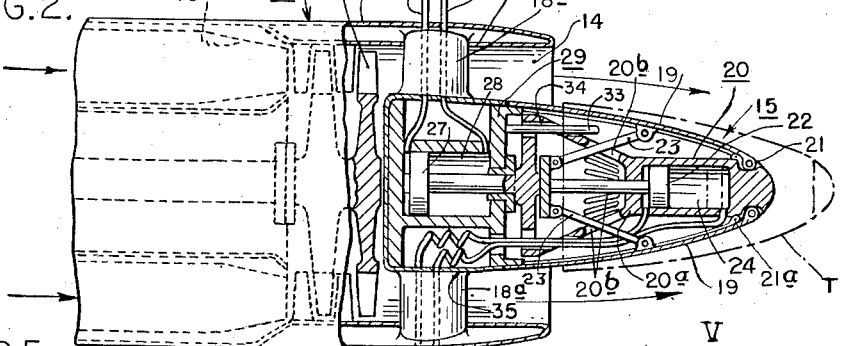
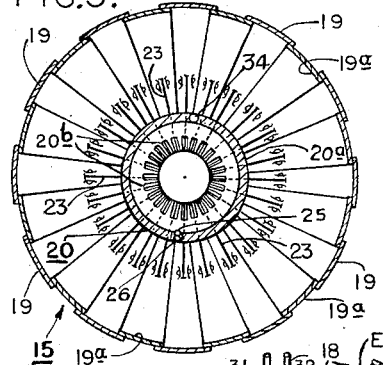
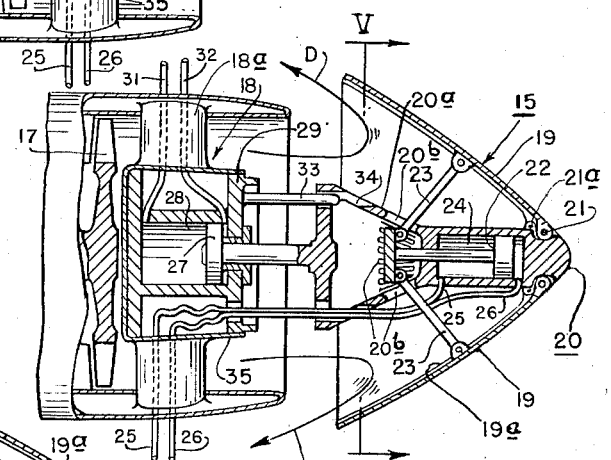
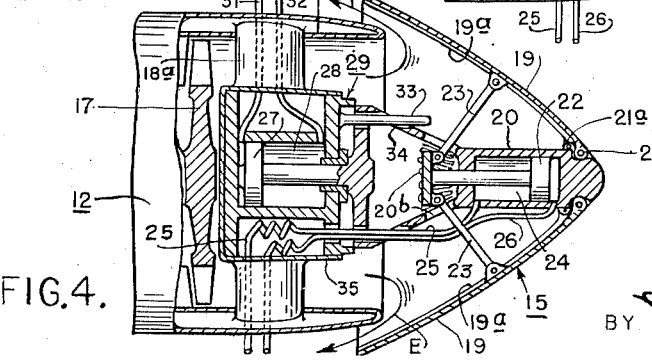

2,803,944

THRUST REVERSING DEVICE FOR JET ENGINES

Reinout P. Kroon, Swarthmore, Pa., assignor to Westinghouse Electric Corporation, East Pittsburgh, Pa., a corporation of Pennsylvania Application November 17, 1954, Serial No. 469,456

6 Claims. (Cl. 60—35.54)

This invention relates to aviation jet propulsion engines, more particularly to a device for reversing the propulsive exhaust gases which issue therefrom, thereby producing negative thrust, and has for an object to provide an improved device of this character.

It is a further object of the invention to provide a thrust reversing device of the above type which is simple in form, imposes negligible drag on the engine in normal forward flight, yet is highly effective in retarding forward flight when required as, for example, in landing on short or icy runways.

These and other objects are effected by my invention as will be apparent from the following description taken in connection with the accompanying drawings, forming a part of this application, in which:

Fig. 1 is a fragmentary side perspective view showing a portion of an aircraft having a jet propulsion engine incorporating the invention;

Fig. 2 is an enlarged axial sectional view of the rear portion of the jet propulsion engine shown in Fig. 1 and showing the thrust reversing device in one position;

Figs. 3 and 4 are axial sectional views similar to Fig. 2, but showing the thrust reversing device in different positions; and Fig. 5 is a sectional view taken on line V—V of Fig. 3.

In the drawings, Fig. 1 illustrates, in side perspective, a portion of a wing 8 attached to the fuselage 9 of an aircraft 10. A nacelle 11 attached to the wing 8 supports a suitable jet propulsion engine 12 in a well known manner. The jet propulsion engine 12 has a forwardly disposed air inlet 13 and an exhaust outlet 14. In accordance with the invention, the exhaust outlet 14 is provided with a thrust reversing device 15.

Although the thrust reversing device may be used with any desired jet propulsion engine, the jet propulsion engine 12 (as partially shown in Fig. 2) is of the well-known turbo-jet type which includes an annular combustion chamber 16 to which pressurized air is fed from a compressor (not shown) and highly heated to form the motive gases, of which a portion of the energy is extracted in driving a turbine 17 and the remainder issues through the exhaust outlet 14. As shown in Fig. 2, the thrust reversing device 15 is in the inactive state, so that the exhaust jet issues from the exhaust outlet 14 in rearward direction to propel the aircraft 10 in forward direction in the usual manner.

The thrust reversing device 15 is centrally disposed in the exhaust outlet 14 and is attached to the rear casing portion 18 of the jet propulsion engine 12. Referring to Figs. 2-5 inclusive, the thrust reversing device is provided with a plurality of outer leaves 19 and inner leaves 19a hinged at one end to a centrally disposed body portion 20 by pivot pins 21 and 21a, respectively and connected at their median portions to an actuating piston 22 by pivoted links 23. The body portion 20 is provided with a central skeletal portion 20a having a plurality of slots 20b through which the links 23 extend. The piston 22 is slidably received in an axially extending bore 24 formed in the body portion 20 and may be moved in fore or aft direction within its travel limits by fluid pressure delivered at each end of the bore by fluid conduits 25 and 26.

The body portion 20 is carried by a piston 27 which in turn is slidably received within a bore 28 formed in a main body portion 29. The main body portion 29 is attached to the engine casing 18 by a plurality of struts 18a. The piston 27 is movable in fore and aft direction within its travel limits by fluid pressure delivered at each end of the bore by fluid conduits 31 and 32. To prevent rotational movement of the body portion 20, the main body portion 29 may be provided with a plurality of guide pins 33 which are slidably received in apertures 34 formed in the skeletal portion 20a.

The outer leaves 19, when they are in the retracted position shown in Fig. 2, substantially abut each other and confine the inner leaves 19a to form a generally conical fairing surface tapering in rearward direction, and the main body portion 29 is provided with a casing 35 of tubular form which cooperates with the outer leaves in this position to extend the fairing surface in forward direction within the casing 18 to the turbine 17, thereby permitting free flow of the exhaust gases without turbulence or other disturbance.

In operation, when it is desired to retard the forward motion of the aircraft 10, fluid is delivered through conduit 31 to the left side of the bore 28 while the fluid in the right side of the bore is exhausted through conduit 32 by valve mechanism (not shown), thereby causing the piston 27 to move to the right, that is, in aft direction. Since the body portion 20 is attached to the piston 27 the entire body portion 20 together with the leaf assemblage 19, 19a is moved in aft direction to the dotted line position T shown in Fig. 2 in which position the forward ends of the leaves 19 and 19a clear the exhaust outlet 14. The leaves 19, 19a are then moved outwardly in unison, by the piston 22, to the position shown in Fig. 3 by admission of fluid to the left side of the bore 24 through conduit 25 while the fluid in the right side of the bore is exhausted through the conduit 26. It will be noted that in this position as the leaves are moved outwardly about the pivots 21 they assume a parasol shape and the free ends of the leaves extend outwardly in radial direction beyond the periphery of the exhaust outlet 14. In this position the exhaust gases are directed forwardly at an angle with the axis of the aircraft fuselage, as indicated by the arrows D (Fig. 3). With the device in this position, the rearward thrust of the propulsion engine is modified and reverse thrust is imparted to the aircraft.

When it is desired to retard the aircraft with maximum reverse thrust, the device is first actuated as described above and then the body 20 is moved in forward direction, that is, to the left as shown in Fig. 4, by admission of fluid to the right side of the bore 28 through conduit 32 and removal of fluid from the left side of the bore through conduit 31. Thus, as seen in Fig. 4, the ends of the leaves overlap the exhaust outlet 14 and reduce the space between the exhaust outlet and the leaves, thereby causing the exhaust gases to reverse and issue from the device in a forward direction indicated by arrows E at a considerably smaller angle to the axis than when positioned as shown in Fig. 3.

Although the device has been shown as positioned in its maximum positions of travel in Figs. 3 and 4 and in its fully retracted position in Fig. 2, it will be understood that the pistons 22 and 27 may be actuated independently of each other within their limits of travel and that within these limits the device may be moved to any desired operative position, thereby providing maximum versatility and maneuverability of the aircraft during landing.

It will also be seen that the device is relatively simple yet rugged and durable.

It will further be noted that the outer leaves 19 overlap the inner leaves 19a as shown in Fig. 5 for all positions from the maximum open position shown in Fig. 3 to the closed position shown in Fig. 2, thereby minimizing leakage of the exhaust gases during operation of the plane in normal flight or with the device in operation. Although the amount of overlapping between adjacent leaves in Fig. 5 has been exaggerated somewhat for illustration purposes, the leaves may be formed to a width permitting the edges of the outer leaves 19 to abut each other when in the fully retracted position shown in Fig. 2, thereby presenting a smooth, unbroken outer surface to the flow of exhaust gases in normal flight.

While the invention has been shown in but one form, it will be obvious to those skilled in the art that it is not so limited, but is susceptible of various changes and modifications without departing from the spirit thereof.

What is claimed is:

1. In a jet propulsion engine having an exhaust outlet, the combination therewith of a thrust reversing device disposed in said exhaust outlet and having a centrally disposed body portion, a plurality of elongated leaves hingeably connected to said body portion, means for moving said body portion fore and aft in an axial direction and means for moving said leaves from a retracted position to an open position, said central body portion and said leaves being so formed and arranged that when said leaves are in the open position the exhaust gases are diverted thereby in forward direction.

2. In a jet propulsion engine having an exhaust outlet, the combination therewith of a thrust reversing device disposed in said exhaust outlet and having a centrally disposed movable body portion, a plurality of elongated leaves hingeably connected to said movable body portion, means for moving said movable body portion fore and aft in an axial direction, means for moving said leaves from a retracted position to an open position, and a stationary body portion disposed in the exhaust outlet and slidably supporting said movable body portion and having an outer fairing portion smoothly cooperating with the outer surfaces of said leaves when the latter are in the retracted position, said movable body portion and said leaves being so formed and arranged that when said leaves are in the open position the exhaust gases are diverted thereby in forward direction.

3. In a jet propulsion engine having an exhaust outlet, the combination therewith of a thrust reversing device disposed in said exhaust outlet and having a centrally disposed body portion, a plurality of elongated leaves hingeably connected to said body portion, means for moving said body portion fore and aft in an axial direction and means for moving said leaves from a retracted position to an open position, said leaves having their hinged ends extending axially beyond said exhaust outlet and having their free ends disposed within said exhaust outlet when in the retracted position, said body being movable in aft direction a distance sufficient to position the free ends of said leaves beyond said exhaust outlet and said leaves being movable radially outwardly to a position in which their free ends extend beyond the periphery of said exhaust outlet.

4. In a jet propulsion engine having an exhaust outlet, the combination therewith of a thrust reversing device disposed in said exhaust outlet and having a centrally disposed movable body portion, a plurality of elongated leaves hingeably connected to said movable body portion, means for moving said movable body portion fore and aft in an axial direction, means for moving said leaves from a retracted position to an open position, said leaves having their hinged ends extending axially beyond said exhaust outlet and having their free ends disposed within said exhaust outlet when in the retracted position, said movable body being movable in aft direction a distance sufficient to position the free ends of said leaves beyond said exhaust outlet and said leaves being movable radially outwardly to a position in which their free ends extend beyond the periphery of said exhaust outlet, a stationary body portion disposed in axial alignment with said movable body portion and provided with a smooth outer surface portion, said leaves further including a set of outer leaves and a set of inner leaves, said outer leaves abutting each other when in the fully retracted position and overlapping said inner leaves and coacting with said outer surface portion of said stationary body to provide a smooth uninterrupted airflow surface.

5. In a jet propulsion engine having a casing provided with an exhaust outlet, the combination therewith of a thrust reversing device disposed in said exhaust outlet and having a centrally disposed body portion, a plurality of elongated leaves including an outer set of leaves and an inner set of leaves disposed in lapping engagement with each other and hingeably connected to one end of said body portion, means for moving said leaves in unison from a retracted position to an open position, said outer leaves abutting each other when in the retracted position and forming a substantially conical fairing surface tapering in a direction toward their hinged ends, said leaves having their hinged ends extending axially exteriorly of said exhaust outlet and having their free ends disposed within said exhaust outlet when in the retracted position, means for moving said body portion fore and aft in an axial direction, said body being movable a distance sufficient to position the free ends of said leaves exteriorly beyond the exhaust outlet, said leaves being movable radially beyond the periphery of said exhaust outlet, and a stationary body portion disposed in axial alignment with the movable body portion and having a tubular outer surface portion extending into close proximity with the free ends of said outer leaves and cooperating with the outer leaves in the retracted position to form a smooth uninterrupted airflow surface.

6. In a jet propulsion engine having an exhaust outlet, the combination therewith of a thrust reversing device disposed in said exhaust outlet and having a centrally disposed body portion, a plurality of elongated leaves hingeably connected to said body portion, means for moving said leaves from a retracted position to an open position, said leaves having their hinged ends extending axially beyond said exhaust outlet and having their free ends disposed radially inwardly of said exhaust outlet when in the retracted position, said leaves being movable radially beyond the periphery of said exhaust outlet, means disposed within said exhaust outlet in axial alignment with said body portion and having a smooth outer surface portion, said leaves further including a set of outer leaves and a set of inner leaves; said outer leaves abutting each other when in the fully retracted position, overlapping and confining said inner leaves and coacting with said outer surface portion to provide a smooth uninterrupted airflow surface.

References Cited in the file of this patent

UNITED STATES PATENTS

| | | |
|---|---|---|
| 2,603,062 | Weiler et al. | July 15, 1952 |
| 2,637,164 | Robson et al. | May 5, 1953 |